United States Patent
Pozgay et al.

(10) Patent No.: US 9,653,799 B2
(45) Date of Patent: May 16, 2017

(54) METHOD AND APPARATUS FOR CONTROLLING SIDELOBES OF AN ACTIVE ANTENNA ARRAY

(75) Inventors: Jerome H. Pozgay, Marblehead, MA (US); James McSpadden, Allen, TX (US); Joel C. Roper, Plano, TX (US); Fatemeh Tingley, Waltham, MA (US)

(73) Assignee: RAYTHEON COMPANY, Waltham, MA (US)

( * ) Notice: Subject to any disclaimer, the term of this patent is extended or adjusted under 35 U.S.C. 154(b) by 1291 days.

(21) Appl. No.: 13/290,393

(22) Filed: Nov. 7, 2011

(65) Prior Publication Data

US 2012/0119952 A1  May 17, 2012

Related U.S. Application Data

(60) Provisional application No. 61/414,148, filed on Nov. 16, 2010.

(51) Int. Cl.

| | | |
|---|---|---|
| *H01Q 3/00* | (2006.01) | |
| *H01Q 3/01* | (2006.01) | |
| *H01Q 3/24* | (2006.01) | |
| *G01S 7/28* | (2006.01) | |
| *H01Q 3/26* | (2006.01) | |
| *H01Q 21/22* | (2006.01) | |
| *H01Q 21/06* | (2006.01) | |

(52) U.S. Cl.
CPC ............. *H01Q 3/01* (2013.01); *G01S 7/2813* (2013.01); *H01Q 3/247* (2013.01); *H01Q 3/26* (2013.01); *H01Q 21/061* (2013.01); *H01Q 21/22* (2013.01)

(58) Field of Classification Search
CPC ..... H01Q 3/01; H01Q 3/247; H01Q 3/26; H01Q 3/2629; H01Q 19/022; H01Q 21/22; G01S 7/2813
USPC .................. 342/368, 371–372, 379–382
See application file for complete search history.

(56) References Cited

U.S. PATENT DOCUMENTS

| | | | | |
|---|---|---|---|---|
| 4,246,585 A | * | 1/1981 | Mailloux | ............. H01Q 3/2611 342/373 |
| 4,347,516 A | * | 8/1982 | Shrekenhamer | ....... 343/700 MS |
| 4,596,986 A | * | 6/1986 | Andrews et al. | ............. 342/373 |
| 4,647,933 A | * | 3/1987 | Hogg | ................... H01Q 21/067 342/26 D |
| 4,849,763 A | * | 7/1989 | DuFort | .................... H01Q 3/36 342/372 |

(Continued)

OTHER PUBLICATIONS

Mailloux, R.J., "Phased array theory and technology," Proceedings of the IEEE , vol. 70, No. 3, pp. 246,291, Mar. 1982, accessed on Aug. 15, 2014 at URL: http://ieeexplore.ieee.org/stamp/stamp.jsp?tp=arnumber=1456553&isnumber=31311.*

(Continued)

*Primary Examiner* — Chuong P Nguyen
(74) *Attorney, Agent, or Firm* — Lando & Anastasi, LLP

(57) ABSTRACT

A method of controlling sidelobe distribution in an active electronically steered array, including electronically reshaping the array aperture so as to reduce sidelobes over a selected region of a coverage volume of the array. In one example, reshaping of the aperture is achieved by electronically turning on and/or off selected radiators in the array to vary the angle of edge discontinuities of the aperture, and thereby move the main sidelobes off the principal plane(s) of operation of the array.

16 Claims, 17 Drawing Sheets

(56) References Cited

U.S. PATENT DOCUMENTS

| | | | | |
|---|---|---|---|---|
| 5,017,928 | A | * | 5/1991 | Haupt .................... H01Q 21/22 342/372 |
| 5,124,712 | A | * | 6/1992 | Caille ................ H01Q 21/0025 342/368 |
| 5,767,806 | A | * | 6/1998 | Watanabe et al. ............ 342/373 |
| 5,929,808 | A | * | 7/1999 | Hassan et al. ................ 342/368 |
| 6,002,364 | A | * | 12/1999 | Kroeger et al. .............. 342/359 |
| 6,873,301 | B1 | * | 3/2005 | Lopez .......................... 343/770 |
| 8,665,132 | B2 | * | 3/2014 | Ranney et al. ............. 342/25 R |

OTHER PUBLICATIONS

Fourikis, "Advanced Array Systems, Applications and RF Technologies," Academic Press, 2000, accessed on Sep. 10 at URL : http://books.google.com/books?id=Ve9PsDJWfZsC.*

On a Simple Method of Obtaining Sidelobe Reduction over a Wide Angular Range in One and Two Dimensions; Ronald J. Pogorzelski; http://my.ece.ucsb.edu/York/Yorklab/Projects/Dynamics/RelatedWork/Ron-Sidelobe%20Reduction.pdf.*

* cited by examiner

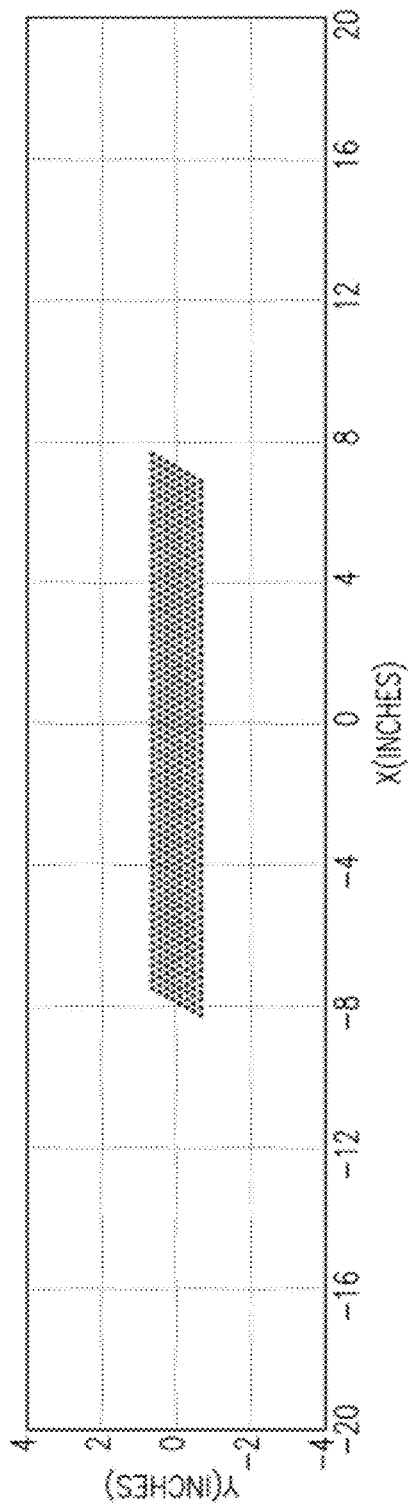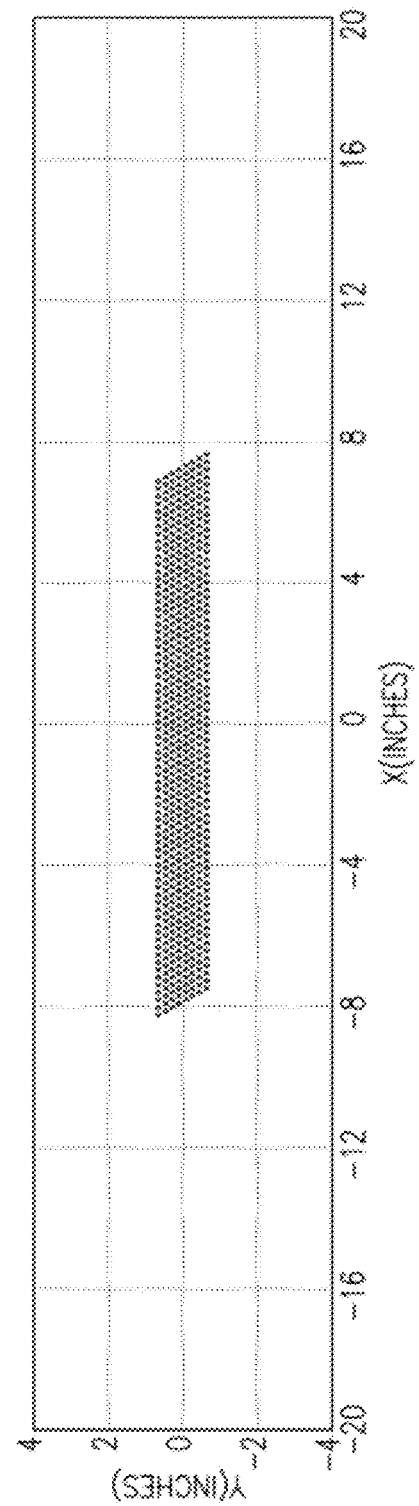

METHOD AND APPARATUS FOR CONTROLLING SIDELOBES OF AN ACTIVE ANTENNA ARRAY

CROSS REFERENCE TO RELATED APPLICATIONS

This application claims priority under 35 U.S.C. §119(e) to U.S. Provisional Application No. 61/414,148 filed on Nov. 16, 2010 and titled "METHOD AND APPARATUS FOR CONTROLLING SIDELOBES OF AN ACTIVE ANTENNA ARRAY," which is herein incorporated by reference in its entirety.

BACKGROUND

In satellite communications systems it is important to control the uplink sidelobe levels to minimize interaction between the terminal and its network and another network operating at or very close to the same frequency. In mobile earth terminals with moderate gain antennas and uplink power levels, the interference problem is exacerbated by the generally high sidelobes that are associated with illuminations that optimize power transfer to the radiating field.

Many mobile earth terminals, and other applications, use active electronically steered arrays (AESAs) for the communications antennas. To address the interference problem, there have been several attempts to reduce AESA sidelobe levels while maintaining illumination efficiency; however these attempts have not been successful. For example, attempts have been made to use non-uniform amplitude illumination distributions (e.g., Taylor illumination) and to use phase tapering techniques. Non-uniform amplitude distributions result in lower radiated signal power levels due to the inherent inefficiency of the amplitude shaping function. Phase tapering is unreliable, being difficult to implement, and also suffers from reduced radiated signal power levels.

SUMMARY OF INVENTION

Aspects and embodiments are directed to independent passive and electronic methods and apparatus for reducing AESA sidelobe levels while maintaining an illumination efficiency of unity, or close thereto (near maximum power transfer to the radiating field). According to one embodiment, there is provided a method of electronically altering the shape of the antenna aperture in order to reduce sidelobe levels over critical regions of the AESA coverage volume while simultaneously maintaining maximum (or close to maximum) effective isotropic radiated power (EIRP) and gain. In one example, electronic control is used to vary the angle of edge discontinuities in the aperture, thereby altering the sidelobe distribution to achieve a desired reduction in sidelobe levels over a particular region of space, as discussed further below.

According to one embodiment, a method of controlling sidelobe distribution in an active electronically steered array comprises electronically reshaping an aperture of the array to control the sidelobe distribution to reduce sidelobes over a selected region of a coverage volume of the array.

In one example, electronically reshaping the aperture includes varying an angle of edge discontinuities in the aperture. Varying the angle of the edge discontinuities may include tilting the edge discontinuities with respect to one operational principal plane of the array. In another example, electronically reshaping the aperture includes reshaping the aperture from a substantially rectangular aperture into a parallelogram-shaped aperture. In one example, reshaping the aperture includes forming the parallelogram-shaped aperture having sides parallel to a unit cell structure of the array. In another example in which the array comprises a plurality of radiators, reshaping the aperture into a parallelogram-shaped aperture includes electronically deactivating a subset of the plurality of radiators. Deactivating the subset of the plurality of radiators may be performed during a transmit operation of the array. The method may further comprise dynamically reconfiguring the aperture between a right parallelogram-shaped aperture and a left parallelogram-shaped aperture responsive to movement of the array. In one example, the array is configured for communications with a geosynchronous satellite, and reshaping the aperture into a parallelogram-shaped aperture includes moving a plane of the sidelobes such that the sidelobes are not parallel to a plane of orbit of the geosynchronous satellite.

According to another embodiment, a method of reducing sidelobes in an active electronically steered array comprises providing the active electronically steered array having a substantially rectangular aperture and including a plurality of radiators, and electronically deactivating a subset of the plurality of radiators to reshape the substantially rectangular aperture into a parallelogram-shaped aperture to cause at least some of the sidelobes to move off a principal plane of the array and reducing the sidelobes over a selected region of coverage.

In one example, electronically deactivating the subset of the plurality of radiators includes deactivating selected radiators of the plurality of radiators to reshape the aperture into a right parallelogram-shaped aperture. In another example, electronically deactivating the subset of the plurality of radiators includes deactivating selected radiators of the plurality of radiators to reshape the aperture into a left parallelogram-shaped aperture. The method may further comprise transmitting a signal using the parallelogram-shaped aperture of the array. In one example, the array is configured for communications with geosynchronous satellites, and the method further comprises dynamically reconfiguring the parallelogram-shaped aperture between a right parallelogram and a left parallelogram responsive to movement of the array in at least one of latitude and longitude.

Another embodiment is directed to a method of controlling sidelobe distribution in an active electronically steered array of a satellite communications system mobile ground station, the array including a plurality of radiators. The method comprises electronically activating a subset of the plurality of radiators of the array to configure an aperture of the array into a parallelogram-shaped aperture to control the sidelobe distribution such that sidelobes are shifted off a principal plane of operation of the array, and transmitting a communications signal using the parallelogram-shaped aperture of the array.

In one example, the method further comprises dynamically reconfiguring the aperture between a right parallelogram and a left parallelogram responsive to movement of the mobile ground station in at least one of latitude and longitude. In another example, electronically activating the subset of the plurality of radiators includes forming the parallelogram-shaped aperture having sides parallel to a unit cell structure of the array. In another example, shifting the sidelobes off the principal plane of operation of the array includes moving a plane of the sidelobes such that the sidelobes are not parallel to a plane of orbit of geosynchronous satellites.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

FIG. 3B is a diagram of the example aperture of FIG. 3A configured as a right parallelogram according to aspects of the invention;

FIG. 3C is a diagram of the example aperture of FIG. 3A configured as a left parallelogram according to aspects of the invention;

DETAILED DESCRIPTION

Figure 1:
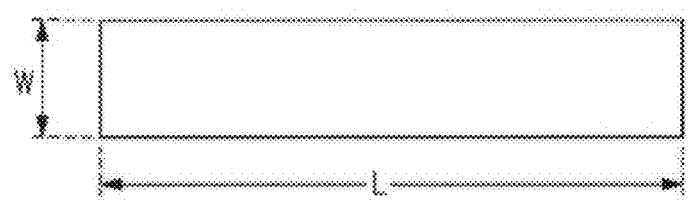
FIG. 1 is a diagram of one example of a conventional rectangular antenna aperture.

Sidelobes of an antenna, for example, an AESA, are produced by the discontinuous distribution of electromagnetic fields generated at the surface of the array. In general, high sidelobes are produced by abrupt discontinuities, for example, as occur at the edges of the array. Accordingly, as discussed above, one technique for reducing sidelobes is to taper the illumination distribution of the AESA to gradually decrease in magnitude from the center of the array outwards to the edges of the array. However, this amplitude taper results in loss of gain for receiving apertures and causes significant loss in EIRP due to the loss of radiated power delivered to the far field of the array and loss of antenna gain. For some applications, such as AESA radars for example, high sidelobes can be accepted in favor of maximizing the system EIRP, and a decrease in the signal-to-noise ratio caused by applying a very rapidly changing illumination distribution can also be tolerated. However, such radar illumination controls cannot be used for the AESA antennas of satellite communications terminals because the transmit sidelobe levels of these terminals are prescribed by the community of networks operating in geosynchronous orbit. In addition, on the receiving side, illumination efficiency is prescribed to achieve a very high gain to thermal noise temperature value.

According to one embodiment, based on an understanding of the disposition of the sidelobes relative to discontinuities in the AESA illumination distribution, the aperture of the array is reshaped so as to use the edge discontinuities to reorient the plane of high sidelobes produced by the aperture such that in preferential planes, the sidelobes are reduced. In one embodiment, the transmit AESA aperture is reshaped such that the abrupt discontinuities are tilted with respect to one operational principal plane of the array. As a result, the principal sidelobe distributions are moved off the principal planes of the AESA aperture to such a degree that significant reduction in sidelobe level can be realized over a desired region of space, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 2:
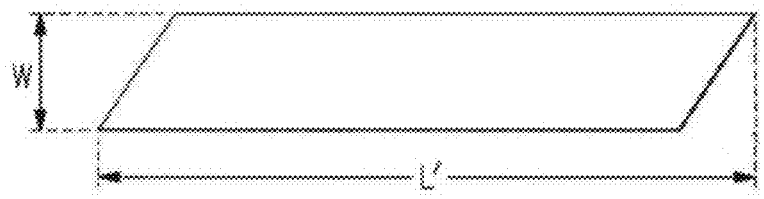
FIG. 2 is a diagram of one example of a parallelogram-shaped antenna aperture according to aspects of the invention.

According to one embodiment, an antenna is reshaped to control its sidelobe levels without substantially altering the size or gain of the antenna. For example, a conventional rectangular aperture (e.g., as illustrated in FIG. 1) may be replaced with a parallelogram-shaped aperture (for example as illustrated in FIG. 2) having approximately the same area. In the example illustrated in FIG. 2, the parallelogram-shaped aperture has two sets of parallel sides and is formed with the short sides tilted relative to the long sides. As discussed in more detail below, it has been demonstrated that even for very high aspect ratios of substantially rectangular apertures (e.g., 10:1), the angled relationship of aperture boundaries in the parallelogram-shaped aperture cause the main sidelobes to move off the principal planes of the antenna aperture to such a degree that significant reduction in sidelobe level can be realized over a desired region of space.

Figure 3A:
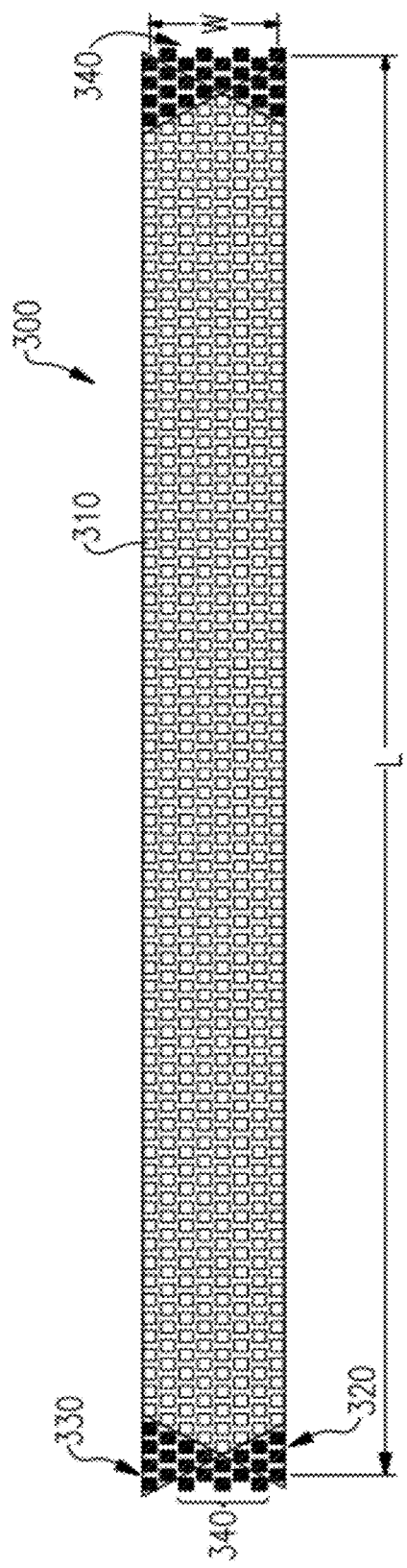
FIG. 3A is a diagram of one example of an AESA antenna including a plurality of radiators uniformly distributed in a grid pattern, according to aspects of the invention.

According to one embodiment, the aperture is formed as a parallelogram with sides that are parallel to the unit cell structure of the array. For example, referring to FIG. 3A, there is illustrated one example of an AESA antenna 300 including 608 radiators 310 uniformly distributed in a grid of eight parallel rows, each row including seventy-six radiators. However, the array may be formed with any number of radiators 310 arranged in numerous different patterns, not limited to the illustrative example shown in FIG. 3A. In one example, for a 60 degree tilt with respect to the principal planes of the aperture, the parallelogram is formed with an interior angle (measured at the bottom left corner of the array, for example) of either 60 degrees or 120 degrees, indicated at reference numerals 320 and 330, respectively, for an isosceles triangular element grid (as shown in FIG. 3A), or 45 degrees and 135 degrees for a square grid. The following examples may refer primarily to an aperture formed with a 60 degree or 120 degree tilt; however, those skilled in the art will appreciate, given the benefit of this disclosure, that many other variations may be implemented in accord with the principles disclosed herein.

In one embodiment, the reshaping of the aperture is achieved electronically by turning on and/or off selected ones of the radiators 310 to vary the angle of the edge discontinuities of the aperture. For example, given a rectangular starting array, as illustrated in FIG. 3A, a parallelogram-shaped aperture is formed by electronically turning off those radiators 310 that are located outside of the desired parallelogram boundary. As can be seen with reference to FIG. 3A, in one example, certain radiators 340 are always turned off during transmit operation of the antenna, whereas other radiators are electronically turned on or off depending on whether the aperture is configured as a right parallelogram (illustrated in FIG. 3B) or a left parallelogram (illustrated in FIG. 3C). In the example of FIG. 3A, there are 576 active simultaneous radiators 310, and an additional sixteen radiators are used to create the electronic tilt left or right. The array also includes sixteen unused radiators 340 for manufacturing uniformity. It is to be appreciated however, that the array may be manufactured without the sixteen unused radiators 340 and/or may include a different number of active and/or inactive radiators. In addition, in another example all radiators can be electronically turned on (i.e., the aperture will have the rectangular shape) such that the array is used in its entirety in applications and/or circumstances where the sidelobe distribution does not produce interference. Although electronic control of radiators within an active phased array has been implemented in some applications, the technique has not been used to specifically control the sidelobe distribution, as is done in accord with the aspects and embodiments of the present invention.

Figure 4A:
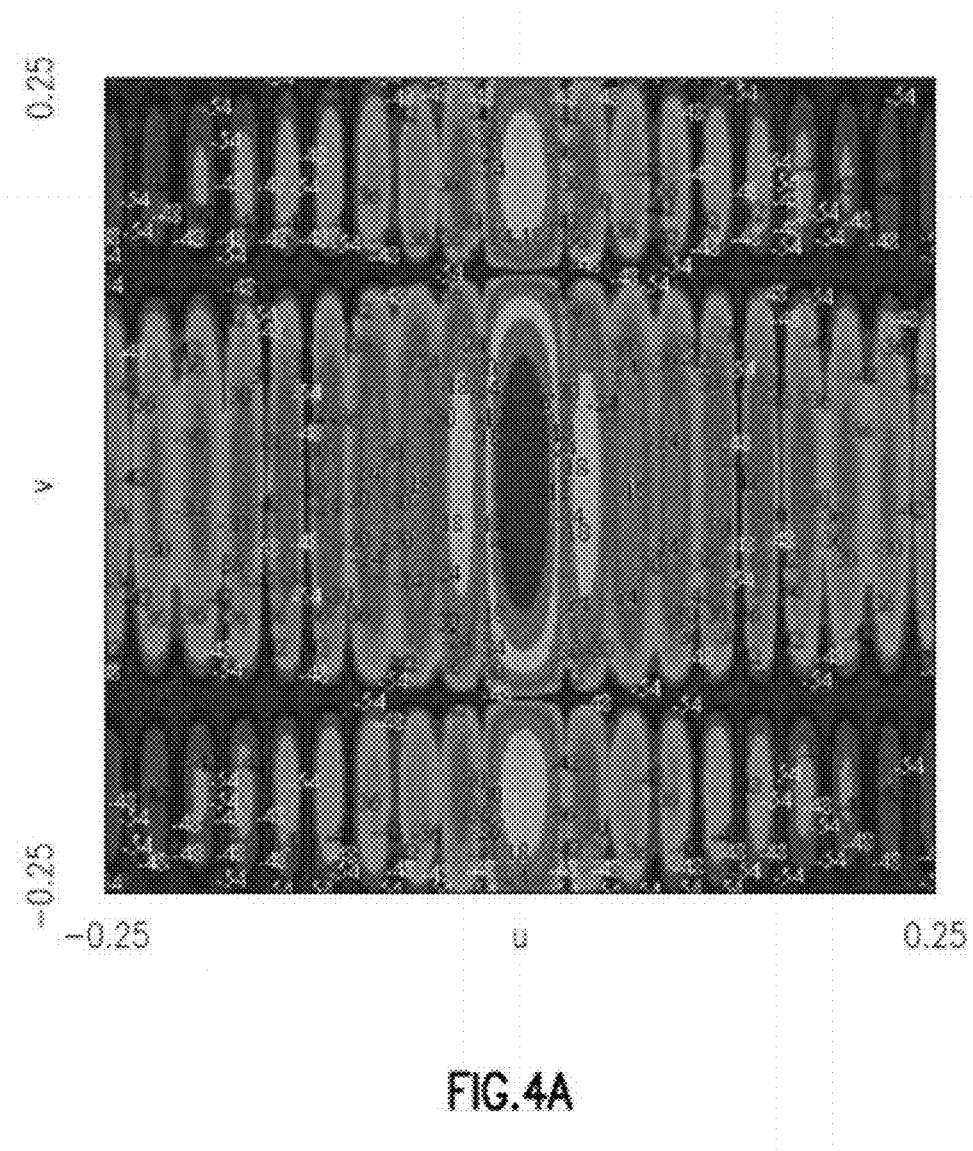
FIG. 4A is a broadside scan of a uniformly illuminated 10 inch by 2 inch Q-band rectangular aperture.
Figure 4B:
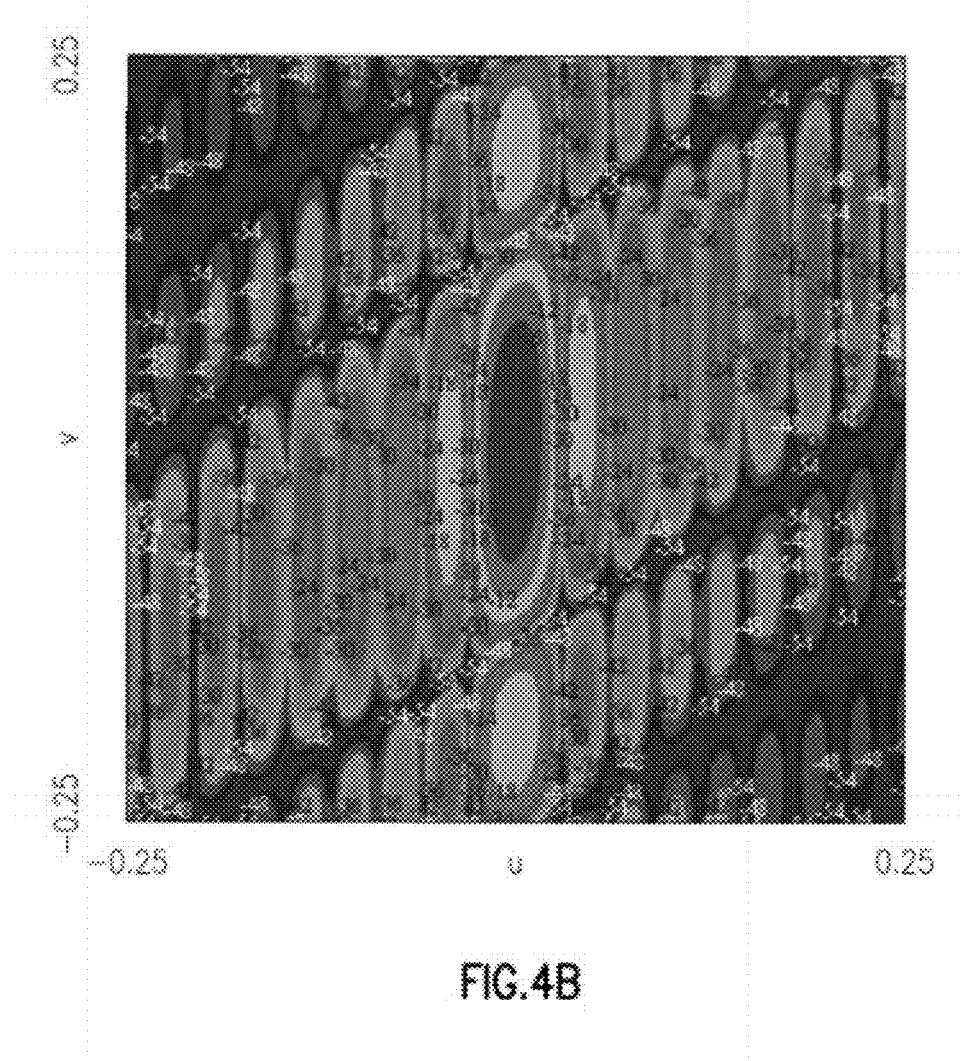
FIG. 4B is a broadside scan of a uniformly illuminated 10 inch by 2 inch Q-band parallelogram-shaped aperture in accord with aspects of the invention.

Referring to FIGS. 4A and 4B there are illustrated broadside scans of a rectangular aperture and a parallelogram-shaped aperture, respectively, which illustrate how tilting the aperture affects the antenna pattern. FIG. 4A is a broadside scan of a uniformly illuminated 10 inch by 2 inch Q-band rectangular aperture. FIG. 4B is a broadside scan of a uniformly illuminated 10 inch by 2 inch Q-band parallelogram-shaped aperture. As shown in FIG. 4B, the reshaping of the aperture from a rectangle to a parallelogram causes the sidelobes to shift off the principal plane of the array as compared to FIG. 4A. This type of aperture reshaping conventionally would be unacceptable for AESA antenna since conventional applications desire the sidelobes to be in the principal plane of the aperture, and not moved off the principal planes as is done in accordance with embodiments of the present invention. In addition, given the high aspect ratio of the apertures in the examples disclosed herein, it would not have been expected that the tilt introduced into the short sides of the aperture to form the parallelogram would cause any significant movement in the sidelobes. Thus, aperture reshaping according to aspects and embodiments provides an unexpected benefit for some applications (for example, communications with geosynchronous satellites) contrary to conventional wisdom.

Aperture reshaping according to various aspects and embodiments may be used to control sidelobe disposition for antenna arrays used in a wide variety of applications. The electronic tilt of the aperture, and hence the location of the sidelobes may be selected based at least in part on the application. For example, in the case of small ground terminals for satellite communications applications, the aperture reshaping moves the planes of the sidelobes such that they are not parallel to the plane of geosynchronous satellite orbits when the AESA long side is substantially parallel to that plane. In one example, because the aperture reshaping is done by electronically turning on or off selected radiators in the array, the aperture may be dynamically reshaped responsive to movement of the ground terminal, as discussed further below.

Movement of the sidelobes, and reduction in the sidelobe areas in particular regions of interest, responsive to electronic tilt of the aperture is demonstrated by the following Ka-band pattern analysis example. In this example, a sinespace pattern is produced for two AESA arrays, one with a conventional rectangular aperture and one with an electronically-configurable parallelogram aperture; each array having 576 active radiators. For this example, the antenna array was pointed toward a geosynchronous satellite and following parameters were used:

Satellite latitude and longitude: $S_{lat}$=0 degrees; $S_{long}$=−150 degrees (relative to the Greenwich meridian);

Antenna latitude and longitude: $A_{lat}$=45 degrees; $A_{long}$=−100 degrees (relative to the Greenwich meridian);

Antenna azimuth angle: $A_{az}$=−124.864 degrees;

Antenna polar angle: $A_{pol}$=54.179 degrees;

Local azimuth angle: $L_{az}$=−30.682 degrees;

Local polar angle: $L_{pol}$=71.191 degrees;

Antenna rotation from the South: $180/\pi*\theta_r$=−30 degrees (where $\theta_r$ is the antenna rotation angle).

Figure 5A:
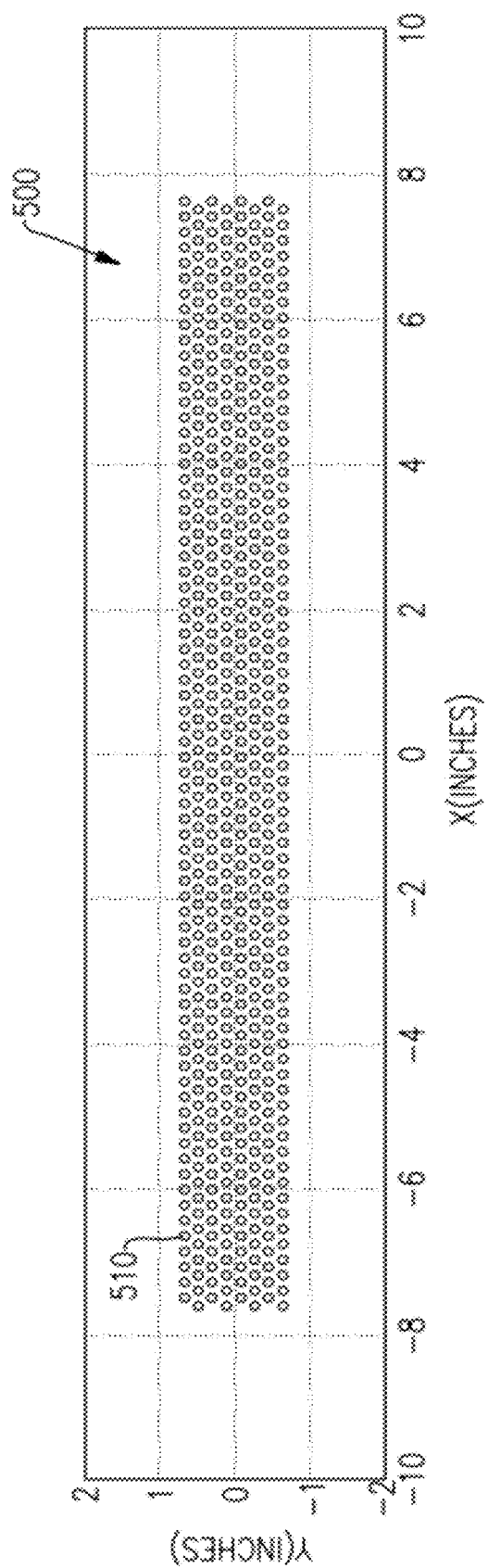
FIG. 5A is a diagram of an example array having a conventional rectangular aperture.
Figure 5B:
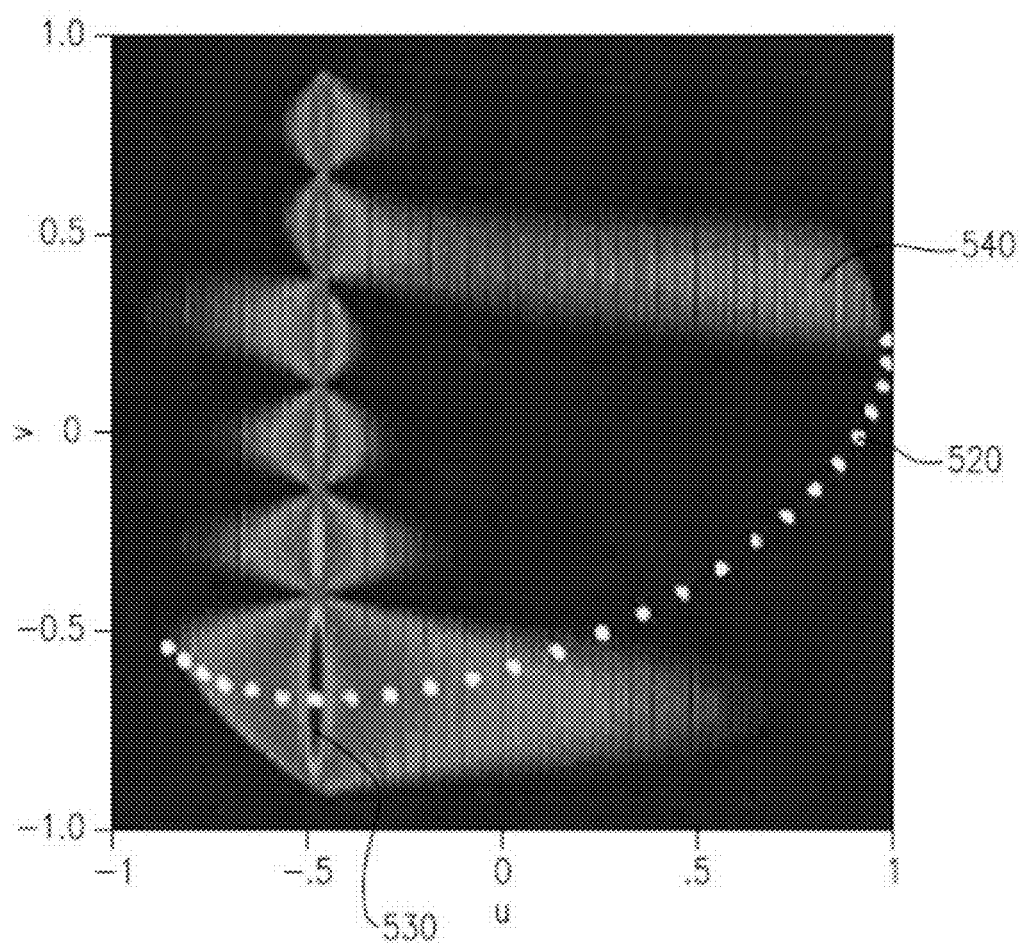
FIG. 5B is a sinespace view of a corresponding antenna pattern for the array of FIG. 5A.

Referring to FIG. 5A there is illustrated a diagram of an example array with a conventional rectangular aperture 500 comprising 576 radiators 510, all of which are active during transmit. A sinespace view of the corresponding antenna pattern for the array of FIG. 5A (using the above parameters) is illustrated in FIG. 5B. In FIG. 5B the dotted line 520 represents the geosynchronous path of the satellite. The main lobe 530 coincides with the path of the satellite; however, at least one of the sidelobes 540 also intersects the path of the satellite, which may cause interference with other systems communicating with the same or adjacent satellites.

Figure 6A:
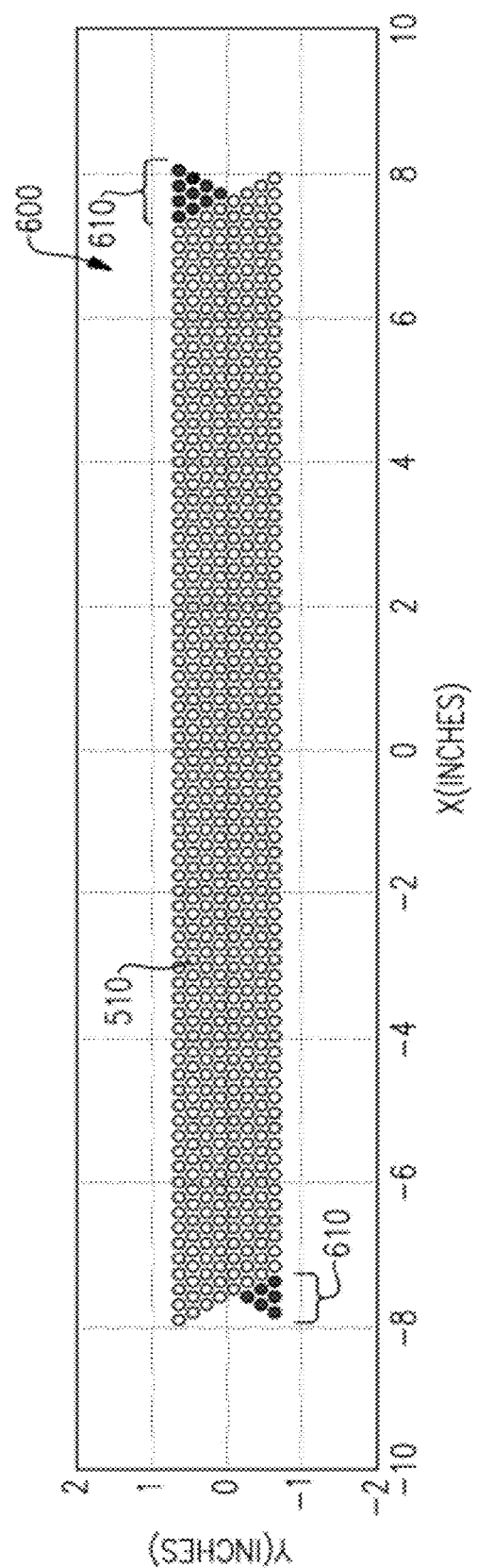
FIG. 6A is a diagram of an example array having a parallelogram-shaped aperture 600, according to aspects of the invention.
Figure 6B:
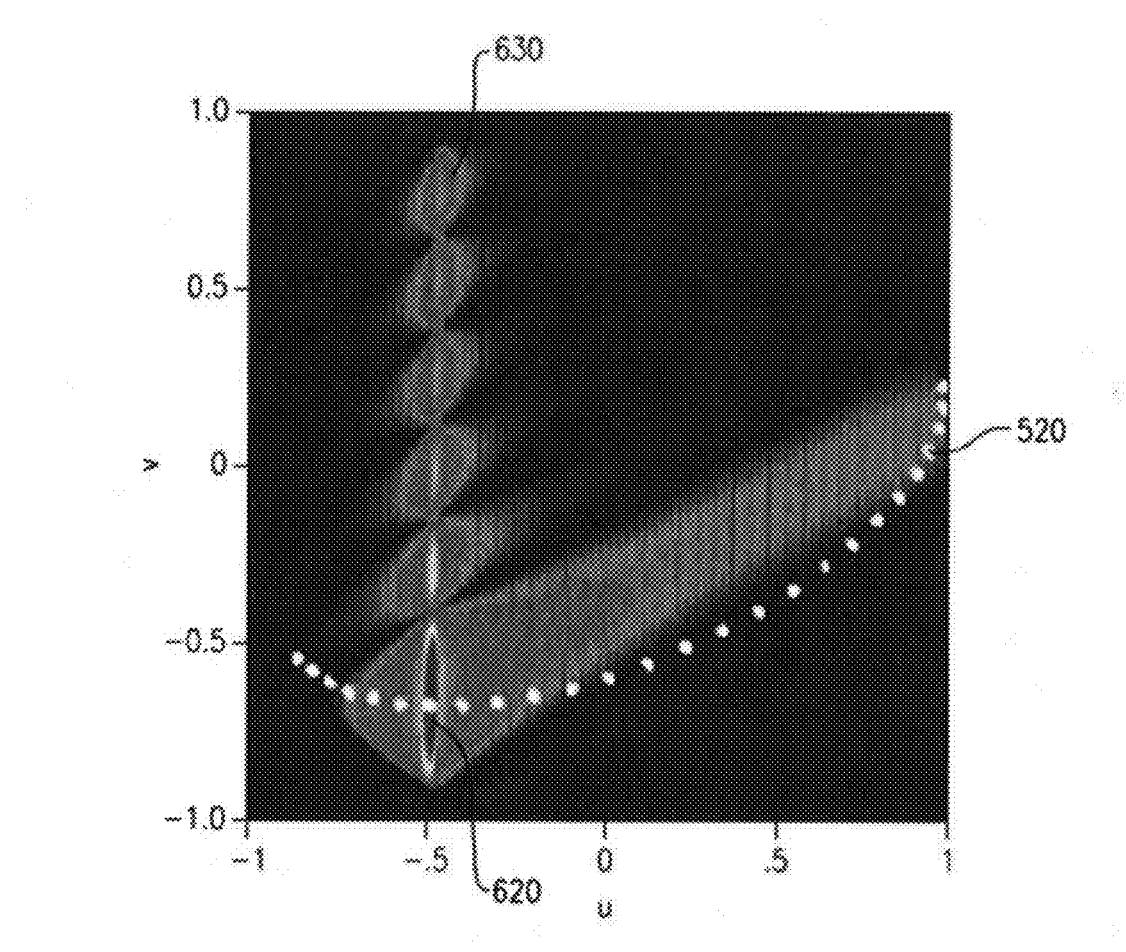
FIG. 6B is a corresponding sinespace scan for the left parallelogram aperture of FIG. 6A, according to aspects of the invention.
Figure 6C:
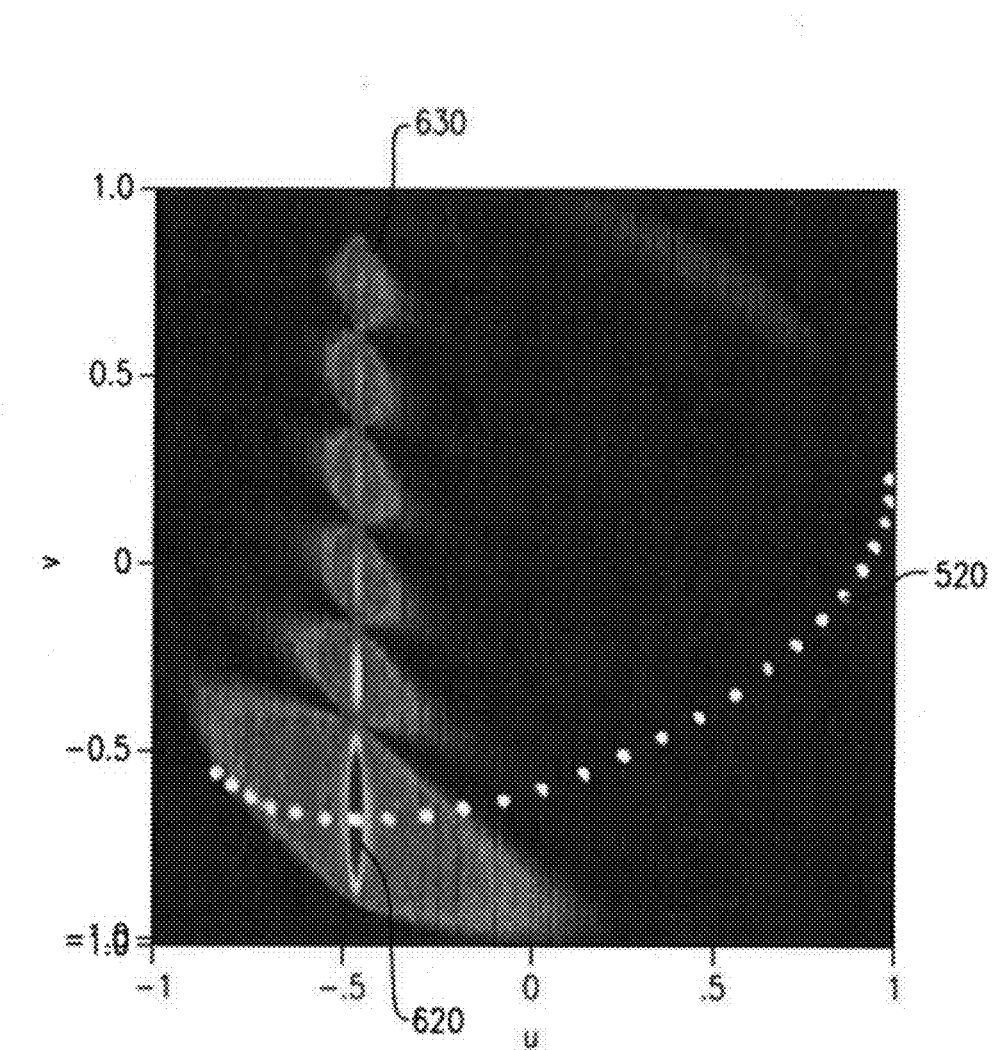
FIG. 6C is an example sinespace scan for the aperture of FIG. 6A reshaped into a right parallelogram according to aspects of the invention.

Referring to FIG. 6A there is illustrated a diagram of an example array with a parallelogram-shaped aperture 600, according to one embodiment. In this example, the array comprises 592 radiators 510, 576 of which are active during transmit and sixteen of which are electronically turned off to achieve the desired tilt of the aperture. In the example illustrated in FIG. 6A, the sixteen radiators at the bottom left (six radiators) and top right (ten radiators) corners, indicated at 610, are turned off to reshape the aperture into a left parallelogram. FIG. 6B illustrates the corresponding sinespace scan (using the above parameters) for the left parallelogram aperture of FIG. 6A. As can be seen with reference to FIG. 6B, the main lobe 620 is angled along the geosynchronous arc 520 of the satellite, and the sidelobes 630 are all angled off the principal plane of the array and away from the arc 520 of the satellite. FIG. 6C illustrates a similar sinespace scan, using the same parameters, for the aperture of FIG. 6A reshaped into a right parallelogram (i.e., the radiators 610 are electronically turned on, and sixteen corresponding radiators 510 in the top left and bottom right corners of the array are electronically turned off). As can be seen with reference to FIG. 6C, for the right parallelogram, while the main lobe 620 remains centered on the geosynchronous arc 520 of the satellite, the sidelobes 630 do not intersect the arc.

Figure 7A:
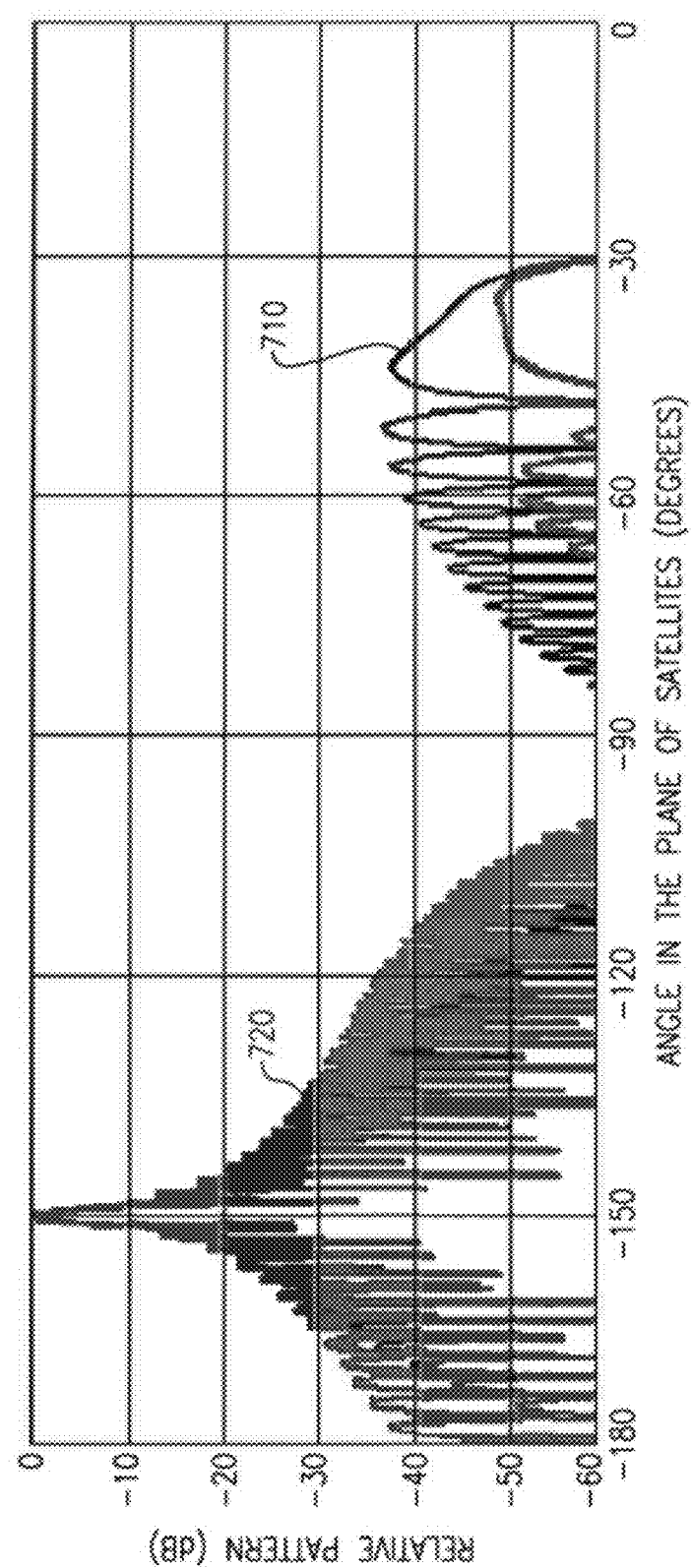
FIG. 7A is a linear plot of the relative antenna patterns (in dB) of the rectangular aperture of FIG. 5A and the left parallelogram aperture of FIG. 6A in the plane of geosynchronous satellites, according to aspects of the invention.
Figure 7B:
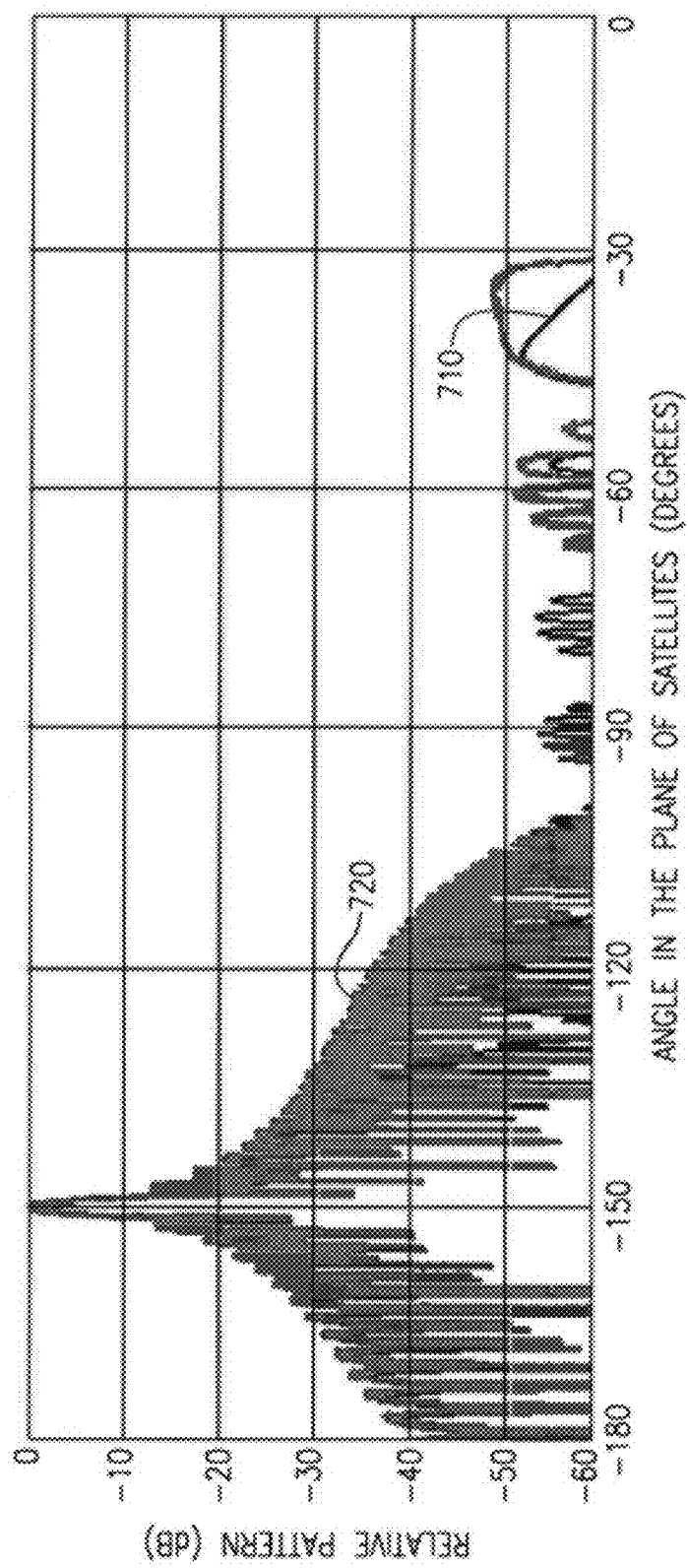
FIG. 7B is a linear plot of the relative antenna patterns (in dB) of the rectangular aperture of FIG. 5A and the right parallelogram, corresponding to the sinespace pattern illustrated in FIG. 6B, in the plane of the geosynchronous satellites, according to aspects of the invention.

Moving the sidelobes off the principal planes of the array may provide a significant reduction in sidelobe levels in a region of interest in the plane of the satellites. This may be clearly seen with reference to FIGS. 7A and 7B. FIG. 7A is a linear plot of the relative antenna patterns (in dB) of the rectangular aperture 500 of FIG. 5A and the left parallelogram aperture 600 of FIG. 6A in the plane of the geosynchronous satellites. In FIG. 7A, trace 710 represents the relative pattern of the left parallelogram aperture 600 and trace 720 represents the relative pattern of the rectangular aperture 500. As can be seen with reference to FIG. 7A, the left parallelogram aperture has significantly lower sidelobe levels in the area of interest close to the peak of the main beam (at −150 degrees, the longitudinal location of the satellite in this example). The left parallelogram aperture does have increased sidelobe levels toward the right of the plot (−30 to −90 degrees in the plane of the satellites); however, these higher sidelobes are located well away from the area of interest. FIG. 7B is a linear plot of the relative antenna patterns (in dB) of the rectangular aperture 500 of FIG. 5A and the right parallelogram, corresponding to the sinespace pattern illustrated in FIG. 6B, in the plane of the geosynchronous satellites. In FIG. 7B, trace 730 represents the relative pattern of the right parallelogram aperture and trace 720 represents the relative pattern of the rectangular aperture 500. As can be seen with reference to FIG. 7B, the right parallelogram aperture has significantly lower sidelobe levels in the area of interest close to the peak of the main beam (at −150 degrees, the longitudinal location of the satellite in this example), and also over the majority of plot.

Figure 7C:
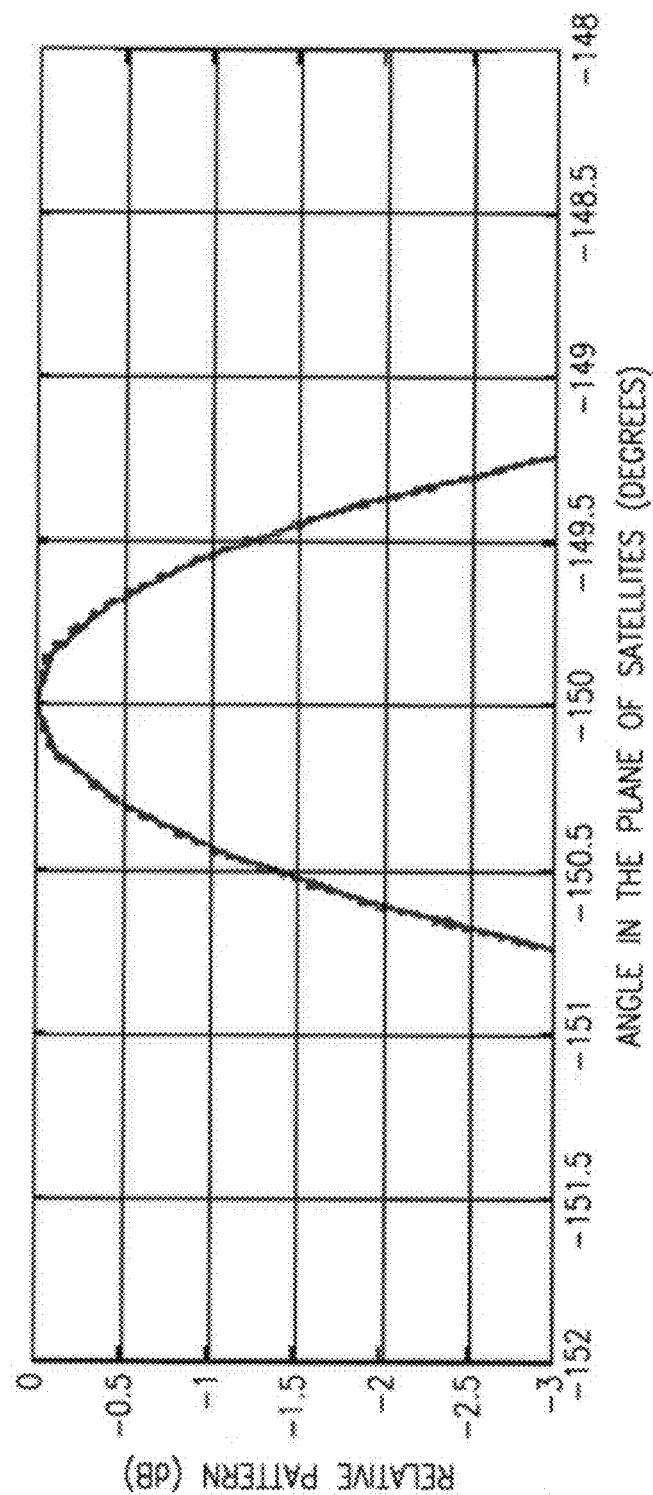
FIG. 7C is an enlarged portion of the linear plot of FIG. 7A showing the peak of the antenna pattern.
Figure 7D:
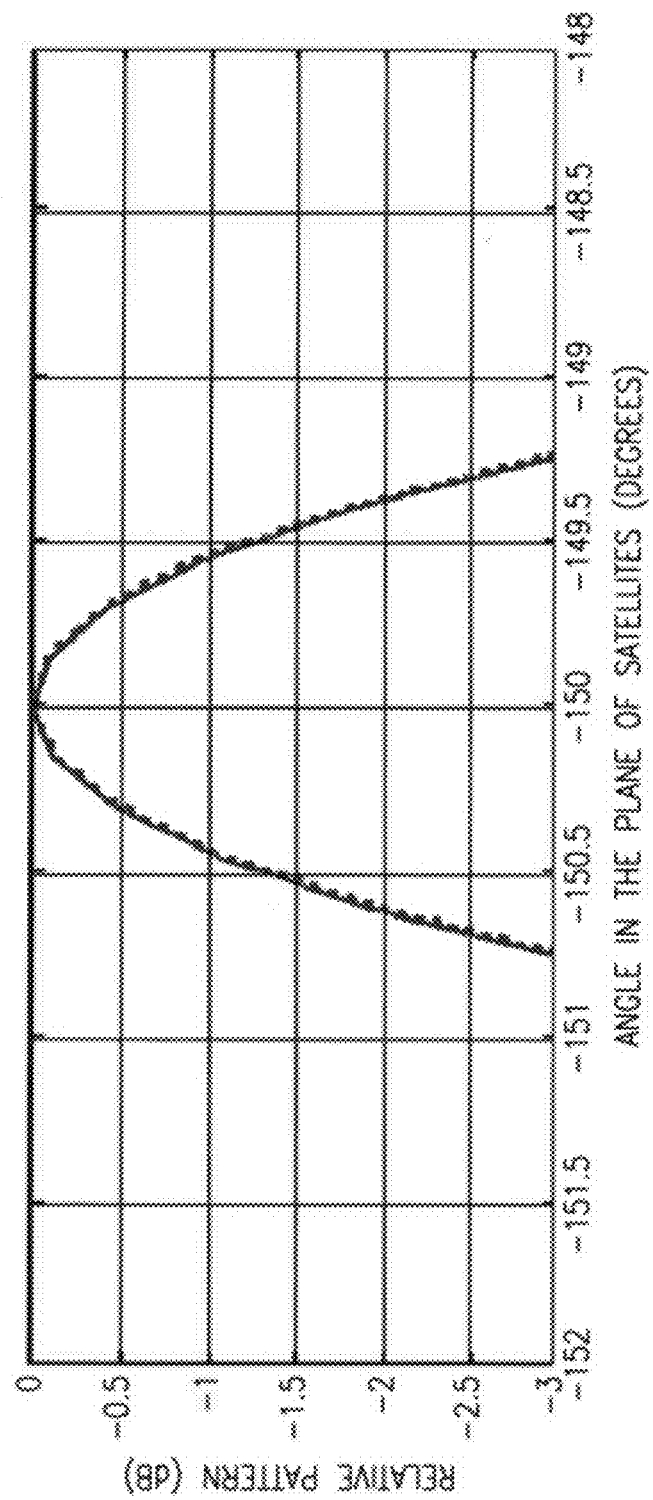
FIG. 7D is an enlarged portion of the linear plot of FIG. 7B showing the peak of the antenna pattern.

Thus, by introducing a tilt into the aperture 600, the sidelobes are moved off the principal plane of the antenna aperture such that significant reduction in sidelobe level can be realized over a desired region of space. In one example, the shape of the aperture, e.g., a left or right parallelogram, can be electronically altered to move the sidelobes for best performance in the plane of the geosynchronous satellite. In addition, the reduction in sidelobe levels is achieved without degrading the antenna gain, gain to thermal noise temperature value, or effective isotropic radiated power (EIRP). FIGS. 7C and 7D are enlarged portions of the linear plots of FIGS. 7A and 7B, respectively, showing the peaks of the antenna patterns. In FIGS. 7C and 7D, the dotted line represents the relative pattern of the rectangular aperture 500 and the solid line represents the relative pattern of the left and right parallelogram apertures, respectively. For both parallelogram apertures, there is very close agreement with the pattern from the rectangular aperture, illustrating no decrease in power as a result of the reshaping of the aperture.

As discussed above, an amplitude taper in the illumination distribution has been used to reduce sidelobes in an array with a rectangular aperture. By contrast, in embodiments of an array having a parallelogram-shaped aperture as discussed above, the tilt of the aperture moves the main sidelobe distributions off the principal planes of the array, thereby achieving a reduction in sidelobe levels over a desired region of coverage without requiring an amplitude taper in the illumination distribution. To the contrary, the sidelobe reduction is achieved even when a uniform illumination distribution is applied to array, which may provide a power savings benefit. For example, the DC power used to apply a uniform illumination distribution to the array of FIG. 3A having either a left or right parallelogram-shaped aperture formed of 576 active radiators is reduced by 155 Watts compared to the DC power used to illuminate a rectangular aperture (having the same number of radiators) with a 6.5 dB amplitude taper. Furthermore, as discussed above and illustrated in FIGS. 7C and 7D, the parallelogram apertures achieve the benefit of reduced sidelobe levels over a desired region of coverage without any appreciable loss in EIRP;

whereas an amplitude taper applied to a rectangular aperture generally results in significant loss in EIRP.

Figure 8A:
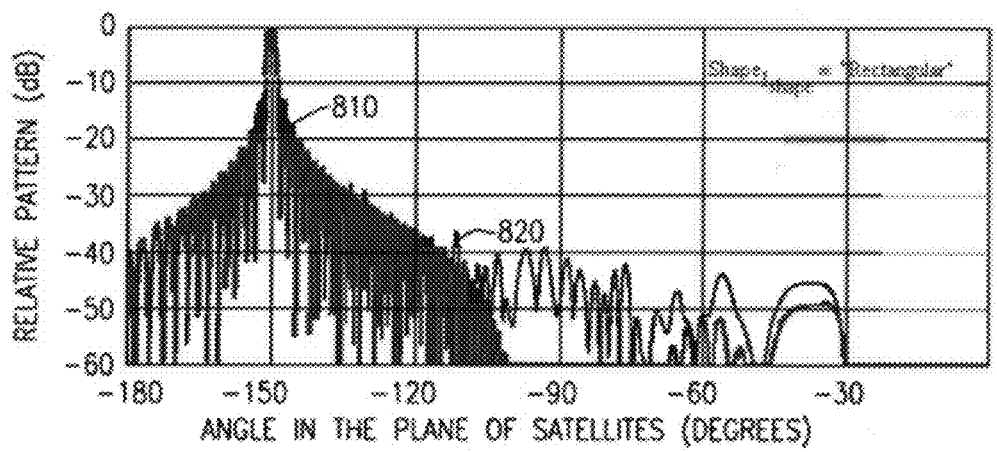
FIG. 8A is a linear plot illustrating the relative antenna patterns (in dB) in the plane of the satellites for a rectangular aperture, with and without phase error, where there is a large longitudinal separation between the satellite and the antenna.
Figure 8B:
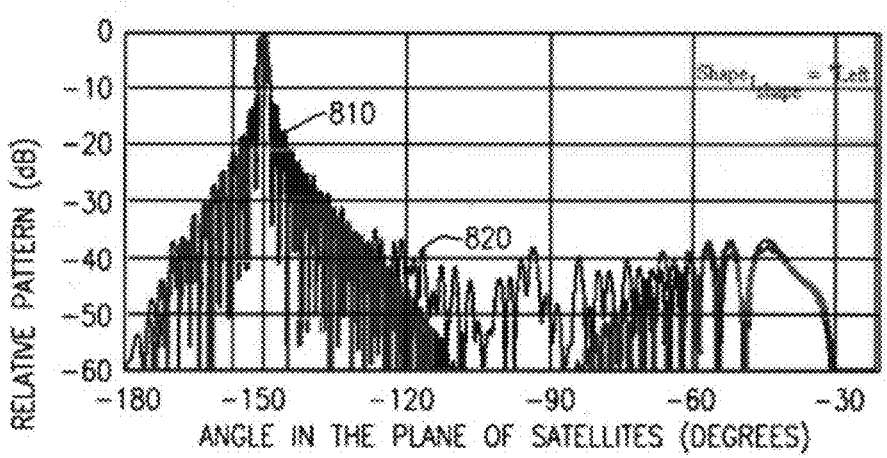
FIG. 8B is a linear plot illustrating the relative antenna patterns (in dB) in the plane of the satellites for a left parallelogram aperture, with and without phase error, where there is a large longitudinal separation between the satellite and the antenna, according to aspects of the invention.
Figure 8C:
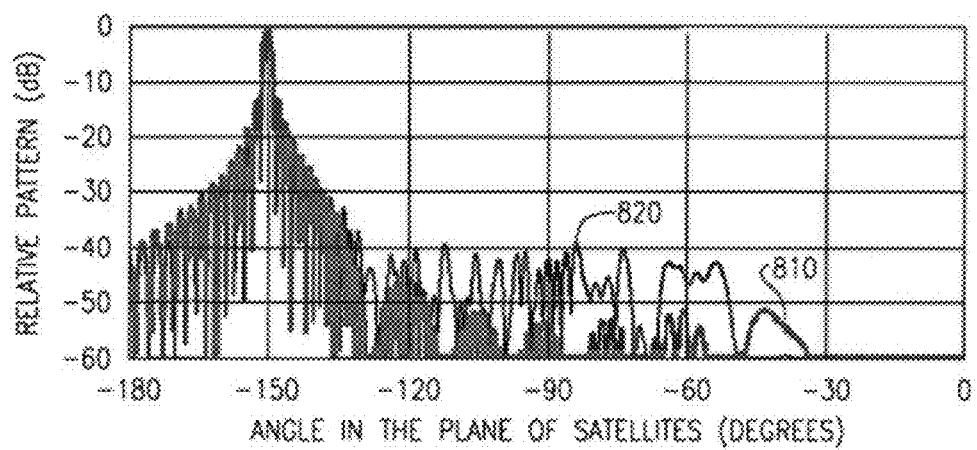
FIG. 8C is a linear plot illustrating the relative antenna patterns (in dB) in the plane of the satellites for a right parallelogram aperture, with and without phase error, where there is a large longitudinal separation between the satellite and the antenna, according to aspects of the invention.

The linear plots illustrated in FIGS. 7A-D assume no phase error in the arrays. FIGS. 8A-8C and 9A-9C are linear plots illustrating the effect of phase error on the antenna patterns, particularly on the sidelobe levels and distributions. In these examples, the rectangular aperture corresponds to FIG. 5A, and the left and right parallelogram apertures correspond to FIG. 6A (modified as discussed above to achieve a right parallelogram aperture). FIGS. 8A-8C illustrate the effect of phase error on the antenna patterns of the uplink array when there is a large longitudinal separation between the satellite and the antenna. In each of FIGS. 8A-8C trace 810 represents the pattern without phase error, and trace 820 represents the pattern with phase error. For FIGS. 8A-8C the following parameters apply:

Antenna azimuth angle: $A_{az}$=−124.864 degrees;
Antenna polar angle: $A_{pol}$=54.179 degrees;
Antenna rotation from the South: $180/\pi*\theta_r$=−30 degrees;
Uplink array rms phase error: $P_{rmst}$=6 degrees.

FIG. 8A illustrates the relative patterns (in dB) in the plane of the satellites for a rectangular aperture, with and without phase error. FIG. 8B illustrates the relative patterns (in dB) in the plane of the satellites for a left parallelogram aperture, with and without phase error. FIG. 8C illustrates the relative patterns (in dB) in the plane of the satellites for a right parallelogram aperture, with and without phase error.

Figure 9A:
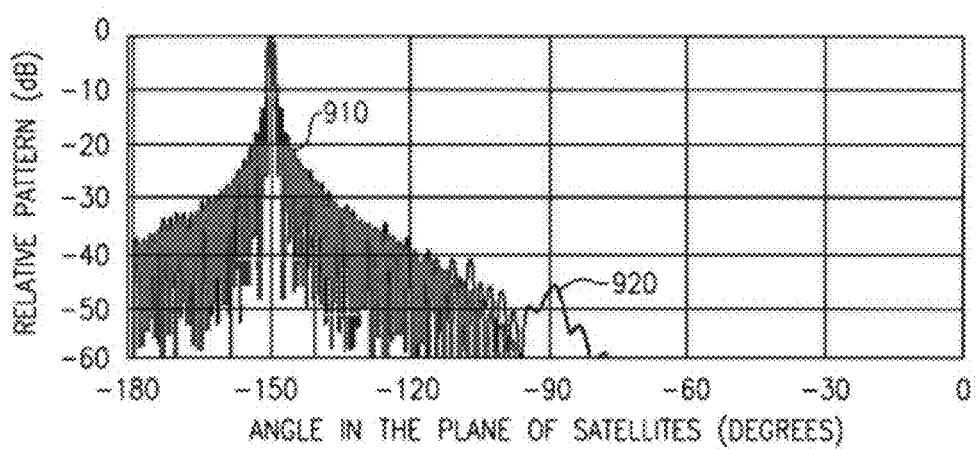
FIG. 9A is a linear plot illustrating the relative antenna patterns (in dB) in the plane of the satellites for a rectangular aperture, with and without phase error, where the satellite and the antenna are on the same longitude.
Figure 9B:
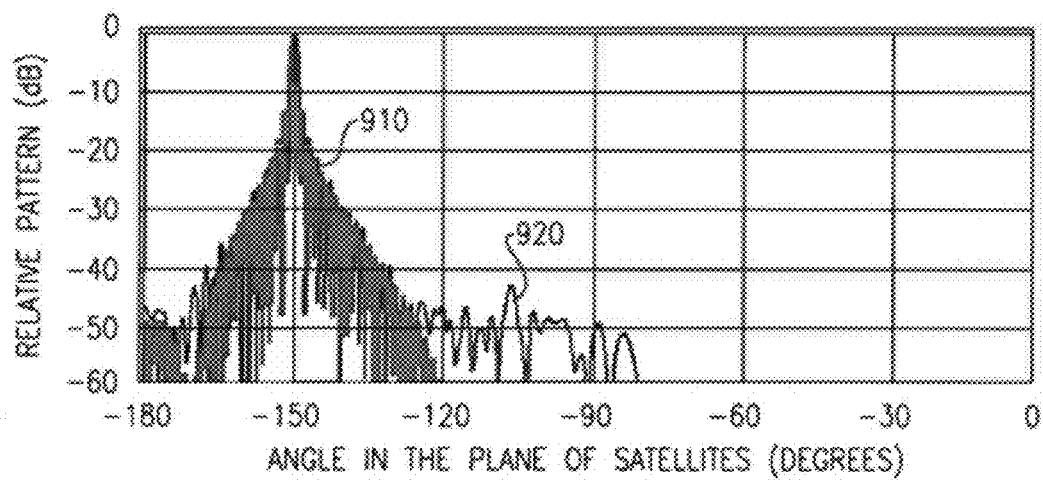
FIG. 9B is a linear plot illustrating the relative antenna patterns (in dB) in the plane of the satellites for a left parallelogram aperture, with and without phase error, where the satellite and the antenna are on the same longitude, according to aspects of the invention.
Figure 9C:
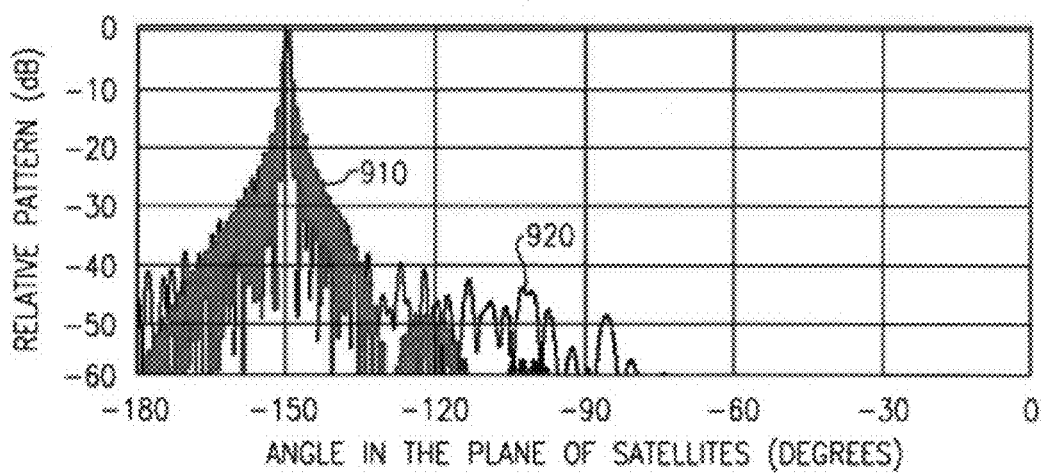
FIG. 9C is a linear plot illustrating the relative antenna patterns (in dB) in the plane of the satellites for a right parallelogram aperture, with and without phase error, where the satellite and the antenna are on the same longitude, according to aspects of the invention.

FIGS. 9A-9C illustrate the effect of phase error on the antenna patterns of the uplink array when the satellite and the antenna are on the same longitude In each of FIGS. 9A-9C trace 910 represents the pattern without phase error, and trace 920 represents the pattern with phase error. For FIGS. 9A-9C the following parameters apply:

Antenna tilt: $180/\pi*\theta_{tilt}$=−20 degrees
Antenna azimuth angle: $A_{az}$=−90 degrees;
Antenna polar angle: $A_{pol}$=31.824 degrees;
Antenna rotation from the South: $180/\pi*\theta_r$=0 degrees;
Uplink array rms phase error: $P_{rmst}$=6 degrees.

FIG. 9A illustrates the relative patterns (in dB) in the plane of the satellites for a rectangular aperture, with and without phase error. FIG. 9B illustrates the relative patterns (in dB) in the plane of the satellites for a left parallelogram aperture, with and without phase error. FIG. 9C illustrates the relative patterns (in dB) in the plane of the satellites for a right parallelogram aperture, with and without phase error.

As discussed above, because the aperture can be electronically reshaped by turning on or off selected radiators, the shape of the aperture can be dynamically varied responsive to any of various external factors. For example, the aperture may be dynamically reconfigured between a left parallelogram and a right parallelogram to move the sidelobes for best performance in the plane of the geosynchronous satellites. In the above example, for the particular locations (latitude and longitude) of the antenna and satellite, the right parallelogram aperture provided the best performance of the three configurations (rectangle, left parallelogram, and right parallelogram). A right or left parallelogram aperture may be selected based on, for example, where the antenna is located relative to the equator and/or whether the satellite is located East or West of the antenna, and may be dynamically reconfigured responsive to movement of the terminal on which the antenna is located, or selection of a different satellite.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A method of controlling sidelobe distribution in an active electronically steered array including a plurality of radiators, the method comprising:
   electronically reshaping an aperture of the array to control the sidelobe distribution to reduce sidelobes over a selected region of a coverage volume of the array at least in part by deactivating a subset of the plurality of radiators at an edge discontinuity of the array to cause at least some of the sidelobes to move off a principal plane of the array and reduce the sidelobes over the selected region of coverage;
   applying a uniform illumination distribution to the plurality of radiators corresponding to the reshaped aperture; and
   dynamically reconfiguring the reshaped aperture between a right parallelogram-shaped aperture and a left parallelogram-shaped aperture responsive to movement of the array.

2. The method of claim 1, wherein electronically reshaping the aperture includes varying an angle of edge discontinuities in the aperture.

3. The method of claim 2, wherein varying the angle of the edge discontinuities includes tilting the edge discontinuities with respect to the principal plane of the array.

4. The method of claim 2, wherein electronically reshaping the aperture includes reshaping the aperture from a substantially rectangular aperture into a parallelogram-shaped aperture.

5. The method of claim 4, wherein reshaping the aperture includes forming the parallelogram-shaped aperture having sides parallel to a unit cell structure of the array.

6. The method of claim 4, wherein the array is configured for communications with a geosynchronous satellite, and wherein reshaping the aperture into a parallelogram-shaped aperture includes moving a plane of the sidelobes such that the sidelobes are not parallel to a plane of orbit of the geosynchronous satellite.

7. The method of claim 1, wherein deactivating the subset of the plurality of radiators is performed during a transmit operation of the array.

8. A method of reducing sidelobes in an active electronically steered array, the method comprising:
   providing the active electronically steered array having a substantially rectangular aperture and including a plurality of radiators;
   electronically deactivating a subset of the plurality of radiators at an edge discontinuity of the array to reshape the substantially rectangular aperture into a left parallelogram-shaped aperture to cause at least some of the sidelobes to move off a principal plane of the array and reduce the sidelobes over a selected region of coverage; and
   applying a uniform illumination distribution to the plurality of radiators corresponding to the left parallelogram-shaped aperture.

9. The method of claim 8, further comprising transmitting a signal using the left parallelogram-shaped aperture of the array.

10. The method of claim 8, wherein the array is configured for communications with geosynchronous satellites, and further comprising dynamically reconfiguring the left parallelogram-shaped aperture between a right parallelogram and the left parallelogram responsive to movement of the array in at least one of latitude and longitude.

11. A method of controlling sidelobe distribution in an active electronically steered array of a satellite communications system mobile ground station, the array including a plurality of radiators, the method comprising:
    electronically activating a subset of the plurality of radiators of the array to configure an aperture of the array into a parallelogram-shaped aperture to control the sidelobe distribution such that sidelobes are shifted off a principal plane of operation of the array;
    dynamically reconfiguring the aperture between a right parallelogram and a left parallelogram responsive to movement of the mobile ground station in at least one of latitude and longitude;
    applying a uniform illumination distribution to the subset of the plurality of radiators; and
    transmitting a communications signal using the parallelogram-shaped aperture of the array.

12. The method of claim 11, wherein electronically activating the subset of the plurality of radiators includes forming the parallelogram-shaped aperture having sides parallel to a unit cell structure of the array.

13. The method of claim 11, wherein shifting the sidelobes off the principal plane of operation of the array includes moving a plane of the sidelobes such that the sidelobes are not parallel to a plane of orbit of geosynchronous satellites.

14. An antenna having electronically controllable sidelobe distribution, comprising:
    an active electronically steered array including a plurality of radiators, the active electronically steered array being configured to electronically reshape an aperture of the array to control the sidelobe distribution to reduce sidelobes over a selected region of a coverage volume of the array at least in part by deactivation of a subset of the plurality of radiators at an edge discontinuity of the array to cause at least some of the sidelobes to move off a principal plane of the array and reduce the sidelobes over the selected region of coverage, wherein the active electronically steered array is further configured to apply a uniform illumination distribution to the plurality of radiators corresponding to the reshaped aperture, and wherein the active electronically steered array is further configured to reconfigure the aperture between a right parallelogram-shaped aperture and a left parallelogram-shaped aperture responsive to movement of the antenna.

15. The antenna of claim 14, wherein the active electronically steered array is further configured to electronically reshape the aperture from a substantially rectangular aperture into a parallelogram-shaped aperture.

16. The antenna of claim 15, wherein the active electronically steered array is further configured to form the parallelogram-shaped aperture having sides parallel to a unit cell structure of the array.

* * * * *